United States Patent
Nomura

(10) Patent No.: US 7,577,520 B2
(45) Date of Patent: Aug. 18, 2009

(54) METHOD FOR UPDATING MAP DATA USED IN ON-VEHICLE NAVIGATION APPARATUS, MAP DATA UPDATE SYSTEM, AUTHENTICATION KEY GENERATION APPARATUS AND NAVIGATION APPARATUS

(75) Inventor: Takashi Nomura, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 549 days.

(21) Appl. No.: 11/037,039

(22) Filed: Jan. 19, 2005

(65) Prior Publication Data
US 2005/0159885 A1    Jul. 21, 2005

(30) Foreign Application Priority Data
Jan. 20, 2004    (JP) .............................. 2004-011585
Oct. 4, 2004    (JP) .............................. 2004-291425

(51) Int. Cl.
*G01C 21/30* (2006.01)
(52) U.S. Cl. ................ 701/208; 701/207; 340/990; 340/995.1
(58) Field of Classification Search .............. 705/51, 705/55, 67, 75, 71–72, 44, 58, 76; 701/207–210, 701/206, 209; 707/207–223, 10; 342/357.01; 709/217; 340/990, 995.1
See application file for complete search history.

(56) References Cited

U.S. PATENT DOCUMENTS

| | | | |
|---|---|---|---|
| 5,959,577 A * | 9/1999 | Fan et al. ................ | 342/357.13 |
| 6,529,159 B1 * | 3/2003 | Fan et al. ................ | 342/357.09 |
| 6,552,682 B1 * | 4/2003 | Fan ........................ | 342/357.09 |
| 6,664,922 B1 * | 12/2003 | Fan ........................ | 342/357.1 |
| 6,768,942 B1 * | 7/2004 | Chojnacki ................ | 701/200 |
| 6,819,986 B2 * | 11/2004 | Hong et al. .............. | 701/29 |
| 7,020,555 B1 * | 3/2006 | Janky et al. ............. | 701/213 |
| 7,051,212 B2 * | 5/2006 | Ginter et al. ............ | 713/193 |
| 7,064,681 B2 * | 6/2006 | Horstemeyer ............ | 340/994 |
| 7,113,110 B2 * | 9/2006 | Horstemeyer ............ | 340/994 |
| 7,185,360 B1 * | 2/2007 | Anton et al. ............. | 726/3 |

(Continued)

FOREIGN PATENT DOCUMENTS

CA    1316706    * 10/2001

(Continued)

OTHER PUBLICATIONS

Secure software upload in an intelligent vehicle via wireless communication links, Mahmud, S.M.; Shanker, S.; Hossain, I.; Intelligent Vehicles Symposium, 2005. Proceedings. IEEE, Jun. 6-8, 2005 pp. 588-593, Digital Object Identifier 10.1109/IVS.2005.1505167.*

(Continued)

*Primary Examiner*—Cuong H Nguyen
(74) *Attorney, Agent, or Firm*—Crowell & Moring LLP

(57) ABSTRACT

In a map data update method for updating map data used in an on-vehicle navigation apparatus by installing update map data, an authentication key is generated based upon an apparatus-inherent ID assigned in correspondence to the navigation apparatus and the use of update map data installed in the navigation apparatus is enabled or disabled by verifying the authentication key assigned to the navigation apparatus.

5 Claims, 15 Drawing Sheets

U.S. PATENT DOCUMENTS

| | | | |
|---|---|---|---|
| 7,185,369 | B2 | 2/2007 | Thoone et al. |
| 2001/0047282 | A1* | 11/2001 | Raveis, Jr. .................... 705/7 |
| 2003/0069673 | A1* | 4/2003 | Hong et al. ................... 701/29 |
| 2004/0073361 | A1* | 4/2004 | Tzamaloukas et al. ...... 701/210 |
| 2005/0159885 | A1* | 7/2005 | Nomura ....................... 701/208 |
| 2007/0239353 | A1* | 10/2007 | Vismans et al. ............. 701/208 |

FOREIGN PATENT DOCUMENTS

| | | | |
|---|---|---|---|
| CN | 1316706 | A | 10/2001 |
| CN | 1451946 | A | 10/2003 |
| CN | 1645055 | A * | 7/2005 |
| EP | 1 189 409 | A2 | 3/2002 |
| EP | 1189409 | A2 * | 3/2002 |
| EP | 1338944 | A2 * | 8/2003 |
| JP | 2002-333323 | | 11/2002 |
| KR | 541416 | B1 * | 1/2006 |

OTHER PUBLICATIONS

Key Distribution Protocols Based on Noisy Channels in Presence of an Active Adversary: Conventional and New Versions With Parameter Optimization; Yakovlev, V.; Korzhik, V.; Morales-Luna, G.; Information Theory, IEEE Transactions on; vol. 54, Issue 6, Jun. 2008 pp. 2535-2549; Digital Object Identifier 10.1109/TIT.2008.921689.*

A new addressing solution for scalable routing in the presence of mobility; Benmohamed, L.; Cole, R.; Doshi, B.; Military Communications Conference, 2008. MILCOM 2008. IEEE; Nov. 16-19, 2008 pp. 1-7; Digital Object Identifier 10.1109/MILCOM.2008.4753339.*

A location map-free visible and reversible watermarking method with authentication ability; Seungwu Han; Fujiyoshi, M., Kiya, H.; Circuits and Systems, 2008. APCCAS 2008. IEEE Asia Pacific Conference on; Nov. 30, 2008-Dec. 3, 2008 pp. 1584-1587; Digital Object Identifier 10.1109/APCCAS.2008.4746337.*

A Robust Watermarking and Image Authentication Technique on Block Property; Kung, C.M.; Juan, K.Y.; Tu, Y.C.; Kung, C.H.; Information Science and Engieering, 2008. ISISE '08. International Symposium on; vol. 1, Dec. 20-22, 2008 pp. 173-177; Digital Object Identifier 10.1109/ISISE.2008.295.*

A Secure Hierarchical Identify Authentication Scheme in Mobile IPv6 Networks; Zhang Zhi; Computational Intelligence and Industrial Application, 2008. PACIIA '08. Pacific-Asia Workshop on; vol. 2, Dec. 19-20, 2008 pp. 862-866 Digital Object Identifier 10.1109/PACIIA.2008.306.*

An integration method of multi-modal biometrics using supervised pareto learning self organizing maps; Dozono, H.; Nakakuni, M.; Neural Networks, 2008. IJCNN 2008. (IEEE World Congress on Computational Intelligence). IEEE International Joint Conference on, Jun. 1-8, 2008 pp. 602-606; Digital Object Identifier 10.1109/IJCNN.2008.4633855.*

One-Way Hash Function Construction Based on Iterating a Chaotic Map; Yong Wang; Maokang Du; Degang Yang; Huaqian Yang; Computational Intelligence and Security Workshops, 2007. CISW 2007. International Conference on; Dec. 15-19, 2007 pp. 791-794; Digital Object Identifier 10.1109/CISW.2007.4425614.*

MapWiki: a ubiquitous collaboration environment on shared maps; Teranishi, Y.; Kamahara, J.; Shimojo, S.; Applications and Internet Workshops, 2006. SAINT Workshops 2006. International Symposium on; Jan. 23-27, 2006 pp. 4 pp. Digital Object Identifier 10.1109/SAINT-W.2006.29.*

Chinese Office Action dated Mar. 14, 2008 with English translation (Thirteen (13) Pages).

* cited by examiner

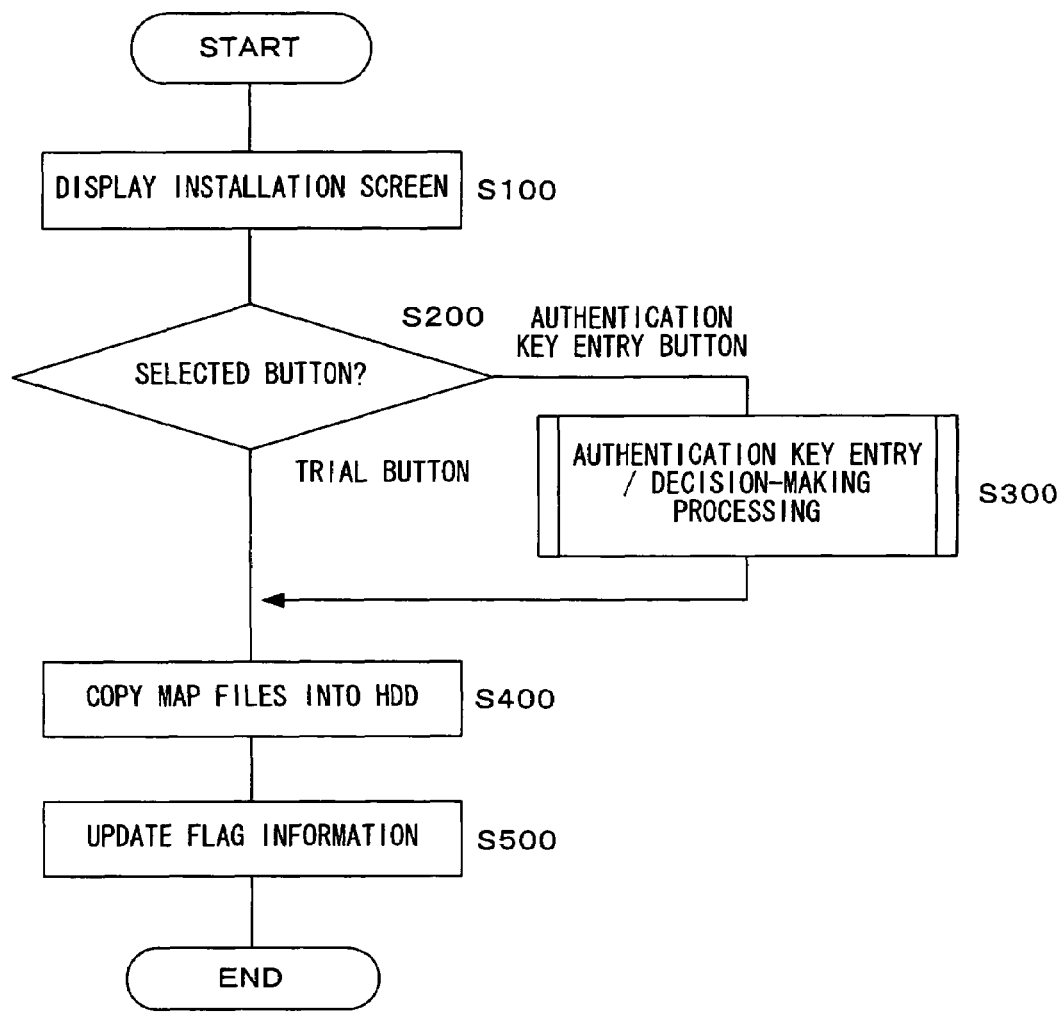

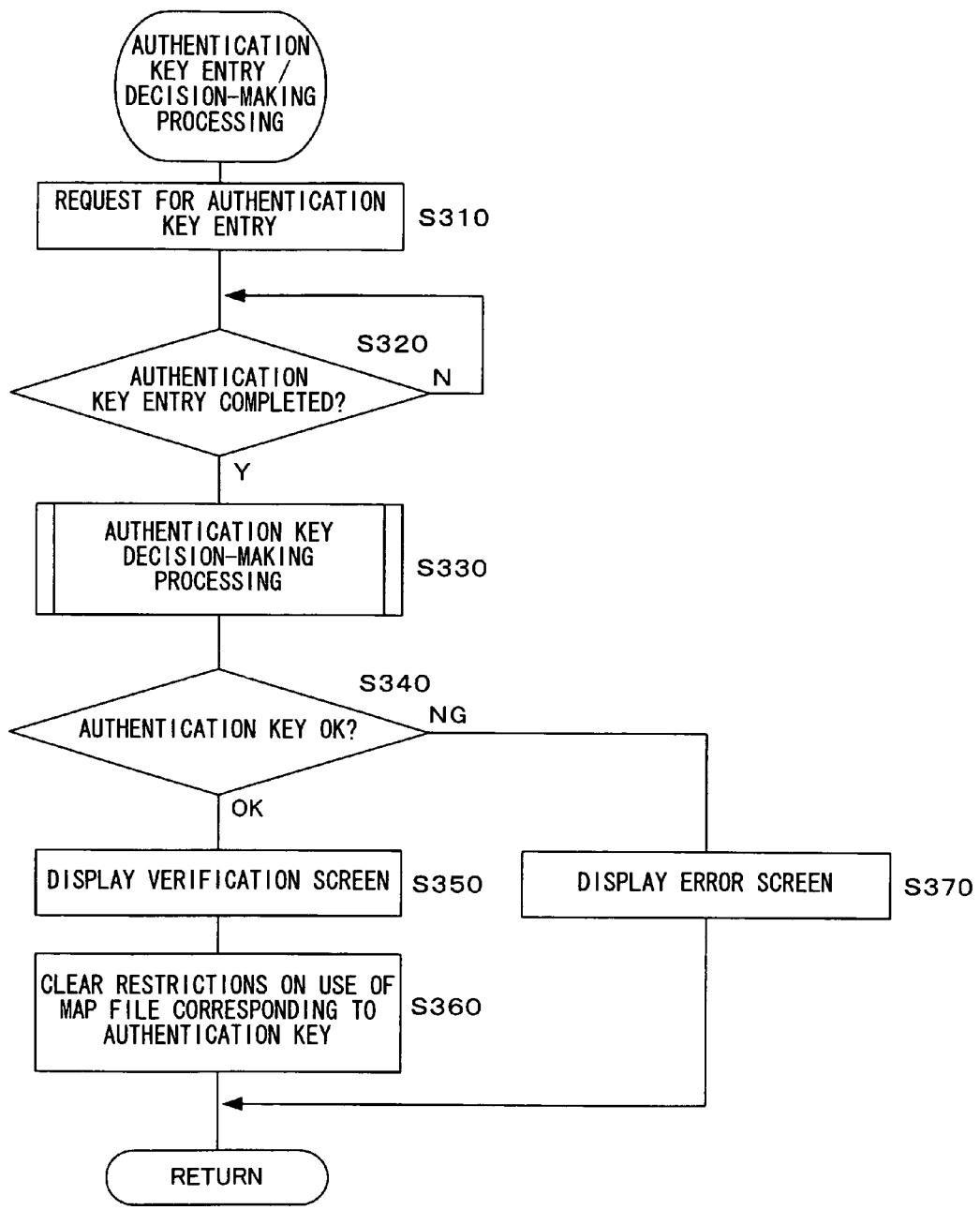

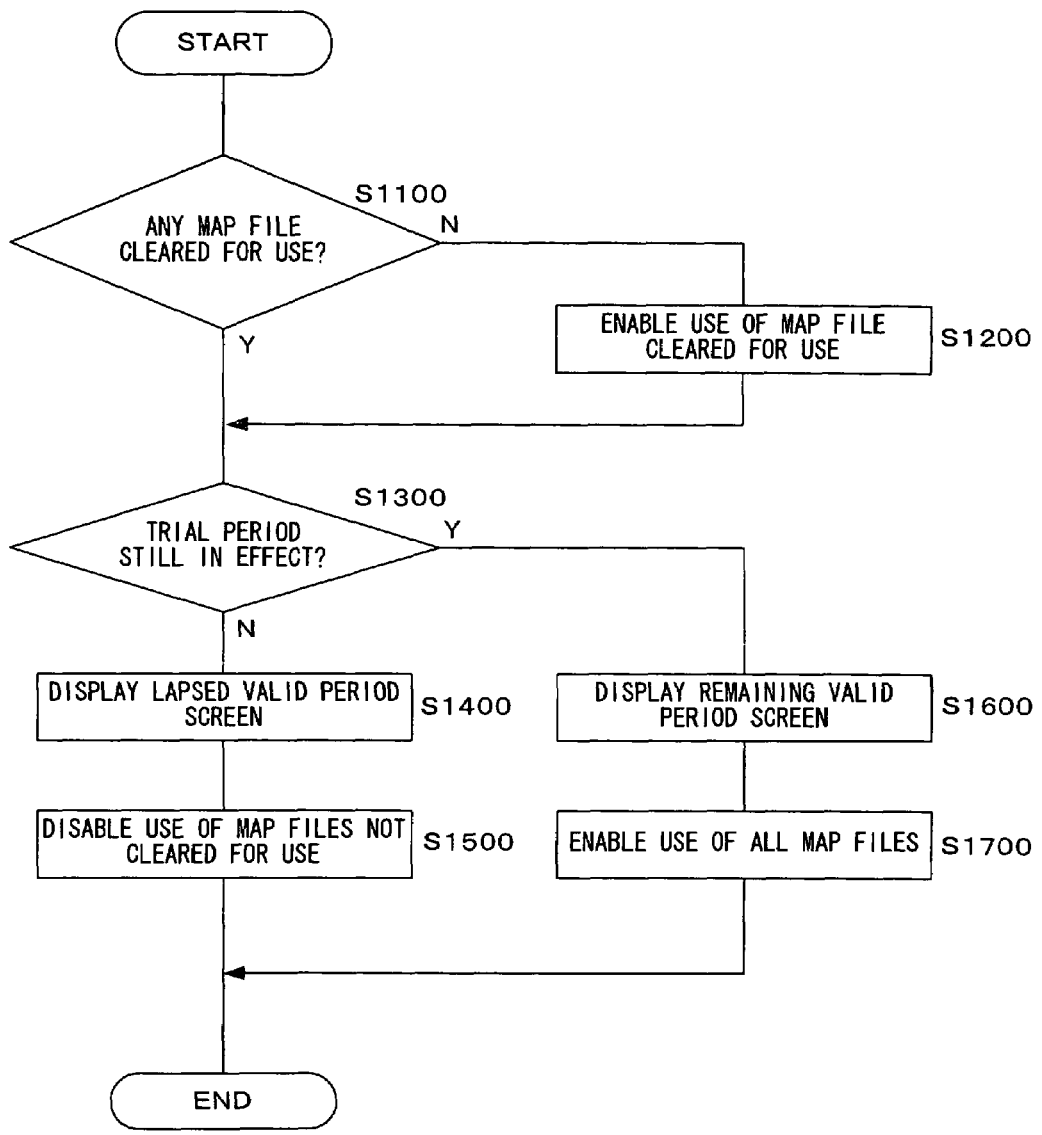

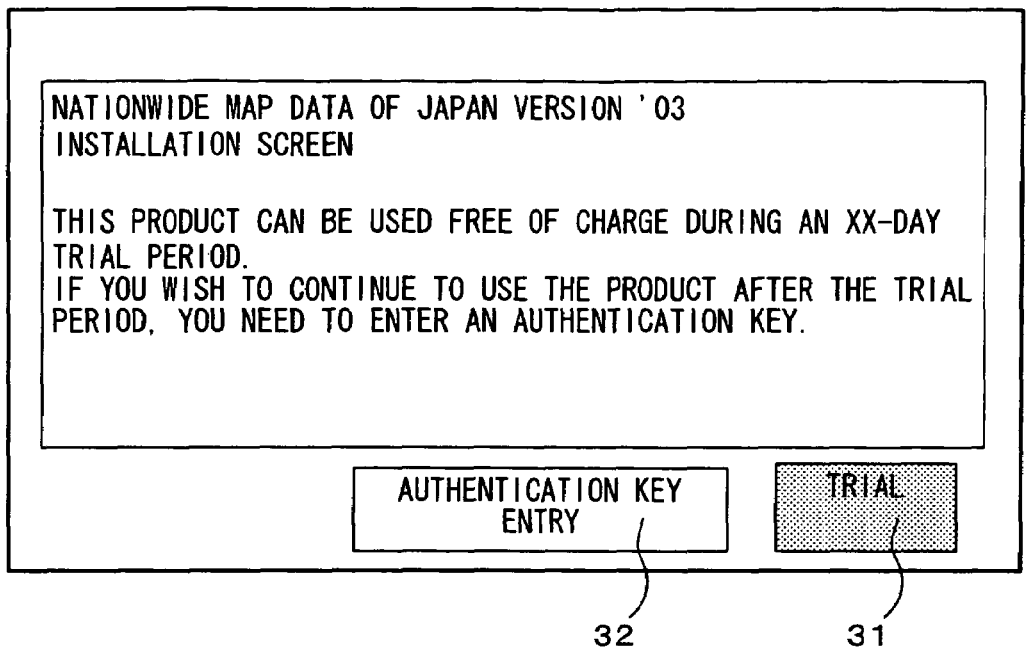
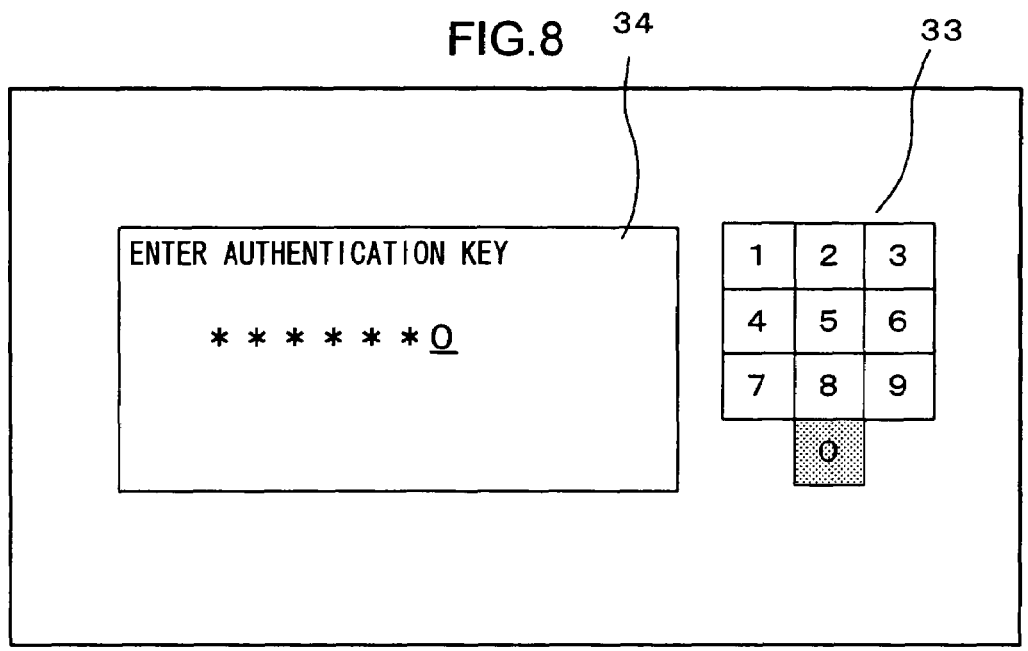

FIG.11

THE VALID TRIAL PERIOD FOR NATIONWIDE MAP DATA OF JAPAN
VERSION '03 HAS EXPIRED.
YOU NEED TO ENTER YOUR AUTHENTICATION KEY IF YOU WISH TO
CONTINUE TO USE THE MAP.

FIG.12

THE VALID TRIAL PERIOD FOR THE NATIONWIDE MAP DATA OF
JAPAN VERSION '03 EXPIRES IN __DAYS.
IF YOU WISH TO CONTINUE TO USE THE MAP DATA AFTER THE
VALID PERIOD EXPIRES, YOU WILL NEED TO ENTER YOUR
AUTHENTICATION KEY.

FIG.17A

ENTER USER ID

USER NAME: A

DO YOU WISH TO HAVE AUTHENTICATION KEY ISSUED FOR MAP DATA UPDATE?

UPDATE

ENTER APPARATUS ID ON PAGE XX IN OPERATING MANUAL

MAP VERSION
23 — | "VERSION 02" | "VERSION' 03" |

MAP AREA
24 —

| ENTIRE NATION | HOKKAIDO-TOHOKU |
| KANTO | CHUBU | KINKI |
| CHUGOKU-SHIKOKU | KYUSHU |

FIG.17E

APPARATUS ID: ******
MAP VERSION: VERSION '03
MAP AREA: KANTO

AUTHENTICATION KEY CONTENTS OK?

SERVICE FEE: "XXX" ¥

PRESS AUTHENTICATION KEY DISPLAY BUTTON TO PROCEED

AUTHENTICATION KEY DISPLAY

YOUR AUTHENTICATION KEY IS

**************

YOUR TRANSACTION HAS BEEN COMPLETED. THANK YOU.

METHOD FOR UPDATING MAP DATA USED IN ON-VEHICLE NAVIGATION APPARATUS, MAP DATA UPDATE SYSTEM, AUTHENTICATION KEY GENERATION APPARATUS AND NAVIGATION APPARATUS

INCORPORATION BY REFERENCE

The disclosures of the following priority applications are herein incorporated by reference:
Japanese Patent Application No. 2004-11585 filed Jan. 20, 2004
Japanese Patent Application No. 2004-291425 filed Oct. 4, 2004

BACKGROUND OF THE INVENTION

1. Field of the Invention

The present invention relates to an update of map data in an on-vehicle navigation apparatus that enables an update of map data recorded therein.

2. Description of the Related Art

There is a method known in the related art through which map data recorded in a hard disk (HDD) and used in an on-vehicle navigation apparatus are updated. The premise of this map data update method is that the HDD is unloaded from the navigation apparatus and is sent to a service center or the like where the map data are updated. Thus, the user must unload the HDD from the navigation apparatus and then reload the HDD containing the updated data. In addition, it poses a problem in that while the HDD is at the service center for the update, the user cannot use the navigation apparatus. In a method addressing this problem, map data downloaded from the Internet are recorded into a recording medium such as a writable DVD and the user himself updates map data by copying the map data in the recording medium into an HDD. However, this method gives rise to a problem in that map data obtained through an unauthorized route can be copied easily.

SUMMARY OF THE INVENTION

In the map data update method according to the present invention for updating map data used in on-vehicle navigation apparatuses by installing update map data, authentication keys are generated based upon apparatus-inherent IDs each assigned in correspondence to a specific navigation apparatus and the use of update map data installed in a navigation apparatus is enabled or disabled by verifying the authentication key assigned to the navigation apparatus.

In this map data update method, an authentication key may be generated based upon the apparatus ID and the version of the update map data.

In addition, each navigation apparatus may obtain an authentication key generated outside based upon the apparatus ID, the version of the update map data and a specified map area, calculate a reference key to be referenced against the authentication key based upon information indicating the apparatus ID, which is held at the navigation apparatus itself, and update map data version information and map area information recorded in the update map data, make a decision as to whether or not the authentication key is correct by comparing the authentication key having been obtained with the reference key and allow the use of a the update map data over the specified map area if the authentication key is judged to be correct or disable the use of the update map data if the authentication key is judged to be incorrect.

It is to be noted that the navigation apparatus adopting the map data update method may allow the use of the update map data during a predetermined period of time regardless of whether or not the authentication key is obtained and disable the use of the update map data unless the authentication key is obtained after the predetermined period of time expires in the map data update method.

In addition, an authentication key may be generated based upon the user-inherent ID assigned to each user in advance.

The map data update system according to the present invention, which includes an authentication key generation apparatus that generates authentication keys and navigation apparatuses that execute the map data update method in any of the modes described above.

The authentication key generation apparatus according to the present invention is used in the map data update system explained above.

The navigation apparatus according to the present invention, too, is utilized in the map data update system described above.

BRIEF DESCRIPTION OF THE DRAWINGS

FIG. 3 presents a flowchart of the processing executed when update map data are installed;

FIG. 4 presents a detailed flowchart of the authentication key entry • decision-making processing;

FIG. 6 presents a flowchart of the processing executed when the navigation apparatus is started up;

FIG. 7 shows an example of an installation screen;

FIG. 8 shows an example of an authentication key entry screen;

FIG. 11 shows an example of a lapsed valid period screen;

FIG. 12 shows an example of a valid period screen;

FIGS. 17A through 17G shows examples of screens that may be brought up on display at the personal computer when an authentication key is issued in a sixth embodiment of the present invention, with FIG. 17A showing a user ID entry screen, FIG. 17B showing an authentication screen key issue request screen, FIG. 17C showing an apparatus ID entry screen, FIG. 17D showing an update area selection screen, FIG. 17E showing a verification screen, FIG. 17F showing a fee display screen and FIG. 17G showing an authentication key display screen.

DESCRIPTION OF THE PREFERRED EMBODIMENTS

First Embodiment

Figure 1:
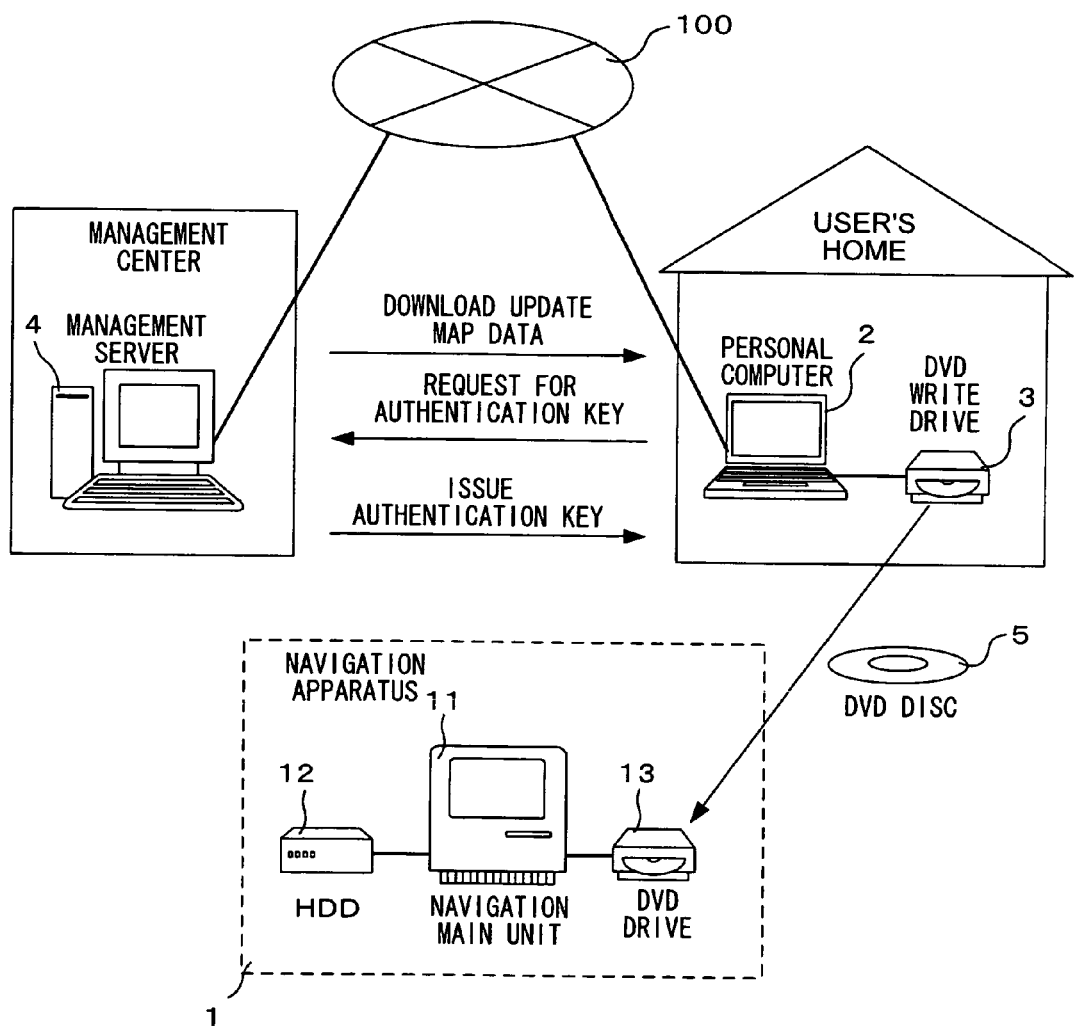
FIG. 1 is a system block diagram provided to facilitate an explanation of the map data update method achieved in an embodiment of the present invention.

The map data update method achieved in an embodiment of the present invention is now explained in reference to the system block diagram shown in FIG. 1. A navigation apparatus 1 is installed in a vehicle and includes a navigation main unit 11, an HDD 12 and a DVD drive 13. The navigation main unit 11 executes navigation processing known in the related art to guide the subject vehicle to a destination by using map data recorded in the HDD 12, and includes a display monitor at which a map image is displayed, a GPS reception device and a vibration gyro used to detect the current position of the subject vehicle, an operating member through which the user enters instructions, an arithmetic operation circuit that executes various types of arithmetic operations and the like. The map data recorded in the HDD 12 can be updated by copying update map data read by the DVD drive 13 as explained later into the HDD 12. It is to be noted that the operations of the HDD 12 and the DVD drive 13 are controlled by the navigation main unit 11.

When updating the map data in the HDD 12, the user accesses a management server 4 at a management center from a personal computer 2 at home and downloads update map data from the management server 4. At this time, the personal computer 2 and the management server 4 are connected with each other via a public network 100 such as the Internet. The management center is set up in a user support service department at, for instance, the manufacturer of the navigation apparatus 1, which provides users with various types of support. As a user support service, the management center provides a map data update service via the management server 4. It is to be noted that various types of user management information including personal information and account information corresponding to individual users as well as update map data are recorded at the management server 4.

The update map data downloaded from the management server 4 to the personal computer 2 are written into a DVD disc 5 set in a DVD write drive 3 connected to the personal computer 2. The DVD disc 5 is a data write-enabled recording medium in compliance with DVD standards, which may be, for instance, a DVD-R, a DVD-RW or a DVD-RAM. A DVD disc compatible with both the DVD write drive 3 and the DVD drive 13 among the various types of DVD discs is used.

Upon recording the update map data into the DVD disc 5 as described above, the user sets the DVD disc 5 at the DVD drive 13. The navigation main unit 11 executes installation processing through which the update map data are read from the DVD disc 5 via the DVD drive 13 and are copied (written) into the HDD 12. The map data update in the navigation apparatus 1 is achieved as the navigation apparatus 1 uses the update map data thus installed in place of the old map data. It is to be noted that the update map data may replace the old map data in units of individual map files to be detailed later or the old map data may be partially updated with the new map data. Under normal circumstances, a write protect is in effect to disable a data write into the HDD 12, and only during the execution of the installation processing, the write protect is cleared to set the HDD 12 in a write-enabled state.

The timing with which the user account is charged is crucial in the map data update method described above. Let us consider, for instance, a system in which the user account is charged when he downloads the update map data. In such a case, once the user downloads the update map data through the correct procedure, other users can directly obtain the downloaded update map data from the initial downloader without accessing the management center and thus are able to update their map data without being charged for the service. Thus, the system gives rise to a problem in that update map data obtained through an illegal channel can be easily copied.

Accordingly, after the update map data are installed in the HDD 12, an authentication key that enables the use of the update map data is issued by the management center 4 and the user enters the authentication key into the navigation apparatus 1 in the present invention. Then, the user account is charged when the authentication key is issued instead of when he downloads the update map data. Since the authentication key issued by the management server is inherent to the particular user, the update map data downloaded by the user cannot be used by other users, thereby preventing illegal copying of the update map data described above.

In addition, the update map data are made available to be used free of charge during a trial period of, for instance, one month. If the user wishes to keep the update map data beyond the trial period, he enters the authentication key issued by the management server. This allows the user to start using the update data map data without delay, and thus motivates the user to use the update data.

The procedure through which the user obtains the authentication key from the management server 4 and enters the authentication key at the navigation apparatus 1 is now explained. Upon downloading the update map data as described earlier, the user issues a request for the authentication key to the management server 4 via his personal computer 2 by specifying the version of the update map data. At this time, the user also enters the apparatus ID assigned to the navigation apparatus 1. The apparatus ID may be, for instance, an inherent number assigned to the navigation apparatus 1, e.g., the production serial number. It is to be noted that the user may issue the request for the authentication key immediately after downloading the update map data or when a considerable length of time elapses after the installation. As mentioned earlier, within the trial period, the installed update map data can be used without the authentication key.

The management server 4 generates an authentication key inherent to the user based upon the apparatus ID of the navigation apparatus 1 and the update map data version entered by the user and transmits the authentication key and thus generated to the personal computer 2. The user account is charged at this time, as the authentication key is transmitted to the personal computer 2, and the charge is recorded at the management server 4 as account information. The authentication key transmitted from the management server 4 is displayed at the personal computer 2, and once the user enters the authentication key in the navigation apparatus 1, the installed update map data remain available even when the trial period expires.

It is to be noted that while the user is billed for the service based upon the account information at the management server 4, information needed to bill a customer (a credit card number, the user name and address, etc.) should be entered by the user when the authentication key is issued. Alternatively, the specific information needed for billing may be obtained by ascertaining the user corresponding to the apparatus ID having been input based upon the personal information of the individual users preregistered in the management server 4.

Figure 2A:
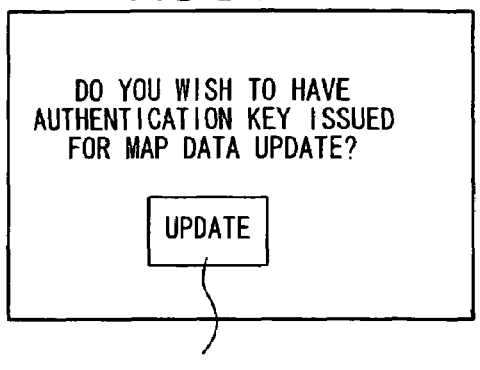
FIGS. 2A through 2F shows examples of screens that may be brought up on display at the personal computer when an authentication key is issued, with FIG. 2A showing an authentication key issue request screen, FIG. 2B showing an apparatus ID entry screen, FIG. 2C showing an update area selection screen, FIG. 2D showing a verification screen, FIG. 2E showing a fee display screen and FIG. 2F showing an authentication key display screen.

Examples of screens that may be displayed at the personal computer 2 when the authentication key is issued as explained above are shown in FIGS. 2A through 2F. FIG. 2A is an initial screen brought up on display when the user issues a request for an authentication key, and as the user selects an update button 21 in the screen with a mouse or the like, the display shifts to the next screen, i.e., an apparatus ID entry screen shown in FIG. 2B.

Figure 2B:
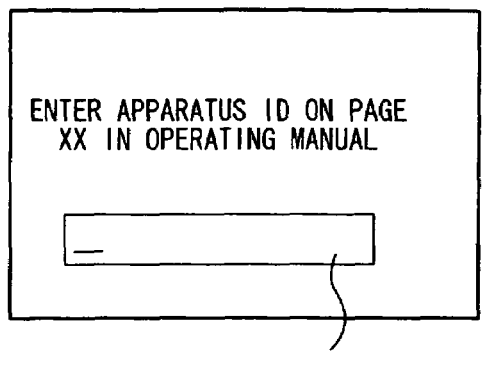

In the apparatus ID entry screen shown in FIG. 2B the user enters the apparatus ID of the navigation apparatus 1 in an input field 22 through a key operation or the like. It is desirable that this apparatus ID be printed in advance in the operating manual or the like and the apparatus ID entry screen include instructions indicating the specific page in the manual on which the apparatus ID is printed, as shown in the figure. Once the apparatus ID is entered, the display shifts to the next screen, i.e., an update area selection screen shown in FIG. 2C. It is to be noted that before the screen shown in FIG. 2C is brought up on display, the user personal information corresponding to the input apparatus ID may be searched at the management server 4 and displayed at the personal computer 2 for user verification.

Figure 2C:
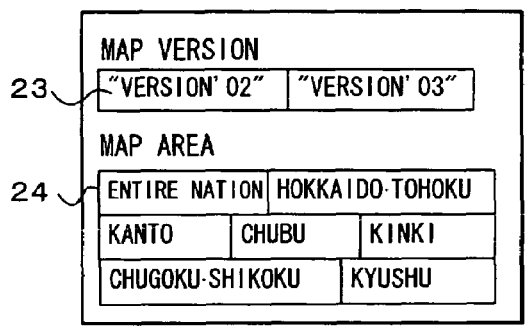

In the update area selection screen shown in FIG. 2C, the user selects the version of the downloaded update map data in a version selection field 23. The user is then prompted to specify a map area over which he wishes to update the map data in an area selection field 24, and thus, a data update in units of map areas is enabled. If the user wishes to specify all the map areas, he selects "entire nation" in the area selection field 24. Once the update map data version and the update map area are selected, the display is switched to the next screen, i.e., a verification screen shown in FIG. 2D. It is to be noted that while the entire nation of Japan is divided into six map areas, "Hokkaido•Tohoku", "Kanto", "Chubu", "Kinki", "Chugoku•Shikoku" and "Kyushu", in this example, it may be divided into regions different from those.

Figure 2D:
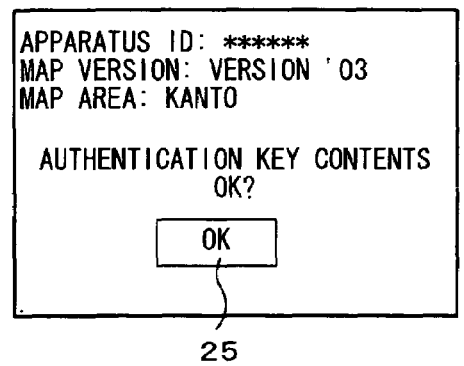
Figure 2E:
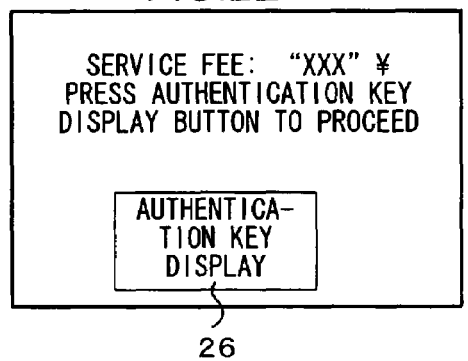
Figure 2F:
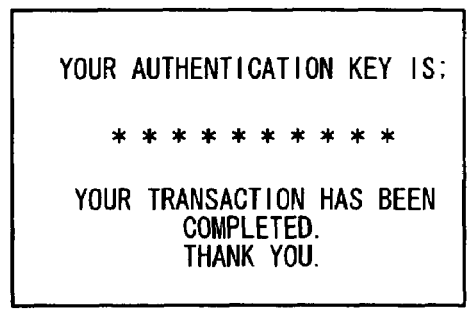

In the verification screen shown in FIG. 2D, the apparatus ID entered by the user in the apparatus ID entry screen shown in FIG. 2B and the update map data version and the update map area selected in the update area selection screen shown in FIG. 2C are displayed for user verification. Upon verifying that the displayed details are accurate, the user selects an OK button 25. In response, the displayed information is transferred from the personal computer 2 to the management server 4 which then executes processing for authentication key generation and account processing. It is to be noted that the method adopted for the authentication key generation is to be explained later.

The management server 4 first transmits the account information to the personal computer 2. At the personal computer 2, the account information transmitted thereto is displayed in a fee display screen shown in FIG. 2E for user verification. Once the user verifies the payment details, he selects an authentication key display button 26. In response, the management server 4 transmits the authentication key, and the display shifts to an authentication key display screen shown in FIG. 2F. The authentication key is issued through the procedure described above.

Next, the method adopted to generate the authentication key is explained. The explanation is given below by referring to a specific example in which an authentication key inherent to a particular user is generated based upon the apparatus ID of the navigation apparatus 1, the update map data version and the update map area, as mentioned earlier.

For instance, let us assume that the apparatus ID is "abcdef", the map version is "03" and the map area is "Kanto". With "03" indicating the map version and "A" representing a numerical value which indicates the map area, an authentication key such as "a0b3cAdef" can be generated by shuffling the numerals. In this example, the numerals indicating the apparatus ID are assigned to the first, third, fifth, seventh, eighth and ninth places in the authentication key starting from the left side, the numerals indicating the map version are assigned to the second and fourth places and the numerical value indicating the map area is assigned to the sixth place. This authentication key contains therein the apparatus ID inherent to the navigation apparatus 1 and is thus a key inherent to the user. It is to be noted that the letters a, b, c, d, e, f and A used in the explanation above each represent a numerical value within a 1 to 9 range.

The authentication key generation method described above is simply an example, and authentication keys may be generated by any of various other methods. As long as each authentication key that is generated contains information indicating the corresponding apparatus ID, map version and map area, and is inherent to the specific user, it may be generated through any method.

Next, details of the processing executed in the navigation apparatus 1 are explained. FIG. 3 presents a flowchart of the processing executed in the navigation main unit 11 when update map data are installed. As the DVD disc 5 having written therein the update map data downloaded from the management server is loaded into the DVD drive 13, the installation of the update map in the HDD 12, to be executed through the processing flow in FIG. 3, starts.

In step S100 in FIG. 3, an installation screen is displayed to inform the user that the installation processing is to be executed. An example of this installation screen is shown in FIG. 7. As either a trial button 31 or an authentication key entry button 32 in the installation screen in FIG. 7 is selected through an operation by the user at the operation member (not shown), the operation proceeds from step S100 to the next step S200. It is to be noted that the trial button 31 is displayed in a color different from the display color of the rest of the screen in FIG. 7, indicating that the trial button 31 has been selected.

In step S200, a decision is made as to whether or not either the trial button 31 or the authentication key entry button 32 has been selected in the installation screen brought up on display in step S100. The operation proceeds to step S300 if the authentication key entry button 32 has been selected, whereas the operation proceeds to step S400 if the trial button 31 has been selected.

In step S300, authentication key entry • decision-making processing is executed to accept an authentication key entry by the user. Through this processing, the restrictions imposed with regard to the use of the map area file corresponding to the authentication key entered by the user are cleared, as detailed later. In this example, the update map data are provided in a plurality of files with each file corresponding to one of the map area units explained earlier. Hereafter, these files are to be referred to as map files. It is to be noted that the details of the processing executed in step S300 are to be explained later in reference to the flowchart presented in FIG. 4. Upon executing step S300, the operation proceeds to step S400.

In step S400, the update map data are installed by copying the individual map files recorded in the DVD disc 5 into the HDD 12. In step S400, all the map files recorded in the DVD disc 5 are installed in the HDD 12.

In the following step S500, the contents of flag information, which is internally set, are updated. As the flag information, information to be used to make a decision as to whether or not the restrictions on the use of the individual map files have been cleared is recorded. The flag information is updated in step S500 by recording information indicating that the restrictions on the use of the map file corresponding to the authentication key having been entered have been cleared if the processing in step S300 has been executed, or by recording information indicating that the restrictions on the use of any of the files have not been cleared otherwise. It is to be noted that the contents of the flag information are referenced during startup processing to be detailed later, through which the navigation main unit 11 is started up, and a decision is made as to whether or not the use of the individual map files having been installed is to be enabled based upon the contents of the flag information. Once the processing in step S500 is executed, the processing flow in FIG. 3 ends.

Next, the authentication key entry • decision-making processing executed in steps S300 in FIG. 3 is explained in detail in reference to the flowchart presented in FIG. 4. In step S310, an entry screen in which the user enters the authentication key is brought up on display and the user is prompted to enter the authentication key. An example of the entry screen brought up on display in this step is shown in FIG. 8. As the user enters specific numerals through the number keys 33 in the entry screen shown in FIG. 8, the numerals are sequentially displayed in an authentication key display area 34. It is to be noted that "0" among the number keys 33 is displayed in a color different from the display color of the other numeral keys in FIG. 8, indicating that "0" has been entered.

In step S320, a decision is made as to whether or not the authentication key entry has been completed in the authentication key entry screen brought up on display in step S310. For instance, the entry may be determined to have been completed when a numerical value with a predetermined number of digits has been input, and may be determined to be incomplete until then. Once the entry is completed, the operation proceeds to the following step S330, whereas the operation remains in step S320 if the entry is incomplete. In step S330, decision-making processing is executed on the entered authentication key. By executing the processing in step S330, the entered authentication key is determined to be either OK or NG. It is to be noted that details of this processing are to be explained later in reference to FIG. 5.

In step S340, a decision is made based upon the results of the processing executed in step S330 as to whether the entered authentication key is OK or NG. If it is determined to be OK, the operation proceeds to step S350, whereas the operation proceeds to step S370 if it is determined to be NG.

Figure 9:
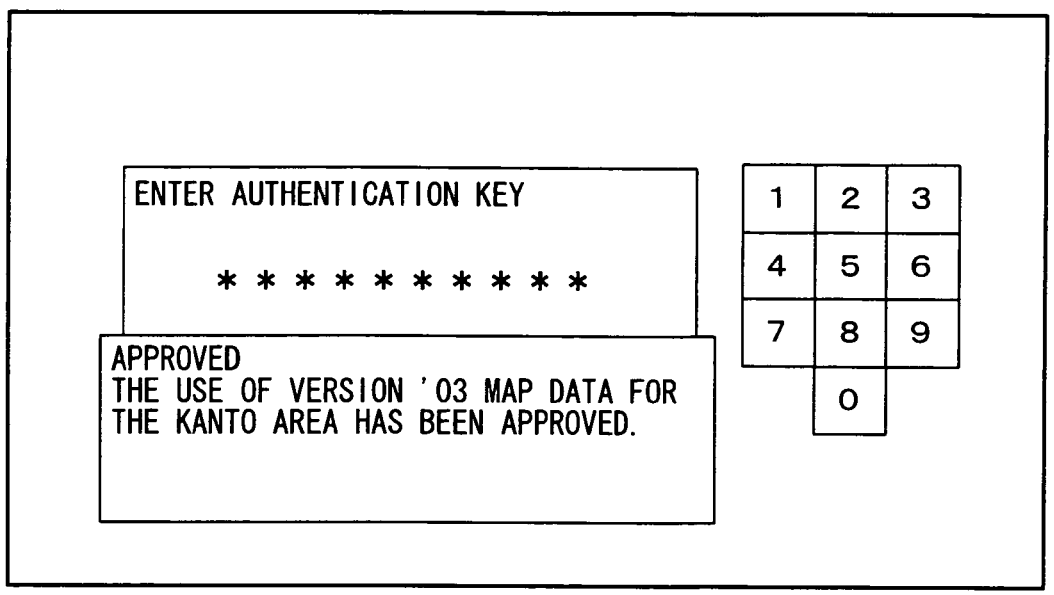
FIG. 9 shows an example of an authentication key entry verification screen.

In step S350, an authentication key entry verification screen is brought up on display to indicate to the user that the correct authentication key has been entered. An example of this verification screen is shown in FIG. 9. It is desirable that the update map data version and the map area over which restrictions on the use of the update map data have been lifted be indicated in the authentication key entry verification screen brought up on display in step S350, in addition to the information confirming that the authentication key has been approved. It is to be noted that the specific details indicated in FIG. 9 can be obtained based upon the information indicating the map version and the map area which is contained in the authentication key as described earlier. In step S360, the contents recorded as the flag information are updated so as to clear the restrictions on the use of the map file corresponding to the authentication key having been entered. Once the processing in step S360 is executed, the processing flow in FIG. 4 ends.

Figure 10:
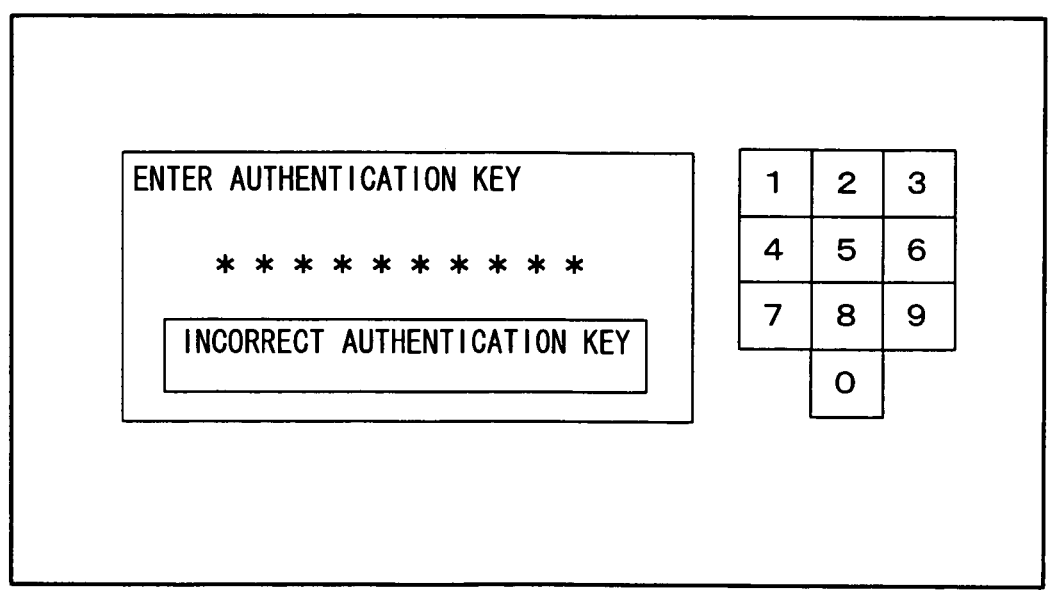
FIG. 10 shows an example of an authentication key entry error screen.

In step S370, an authentication key entry error screen such as that shown in FIG. 10 is brought up on display to inform the user that the authentication key having been entered is incorrect. If the processing in step S370 is executed, the restrictions on the use of the map file are not cleared and the contents of the flag information are not updated either. After executing step S370, the processing flow in FIG. 4 ends. It is to be noted that the operation may return to step S310 after executing step S370 to prompt the user to reenter the authentication key, instead.

It is to be noted that the user should be enabled to call up the processing in FIG. 4 explained above from a menu screen or the like in the navigation main unit so that the processing can be executed any time as well as in step S300 in FIG. 3 during the installation process. Since this allows the user to enter the authentication key any time he wishes, the user can enter the authentication key to clear the restrictions on the use of update map data over a specific map area that he wishes to use continuously after the trial period expires.

Figure 5:
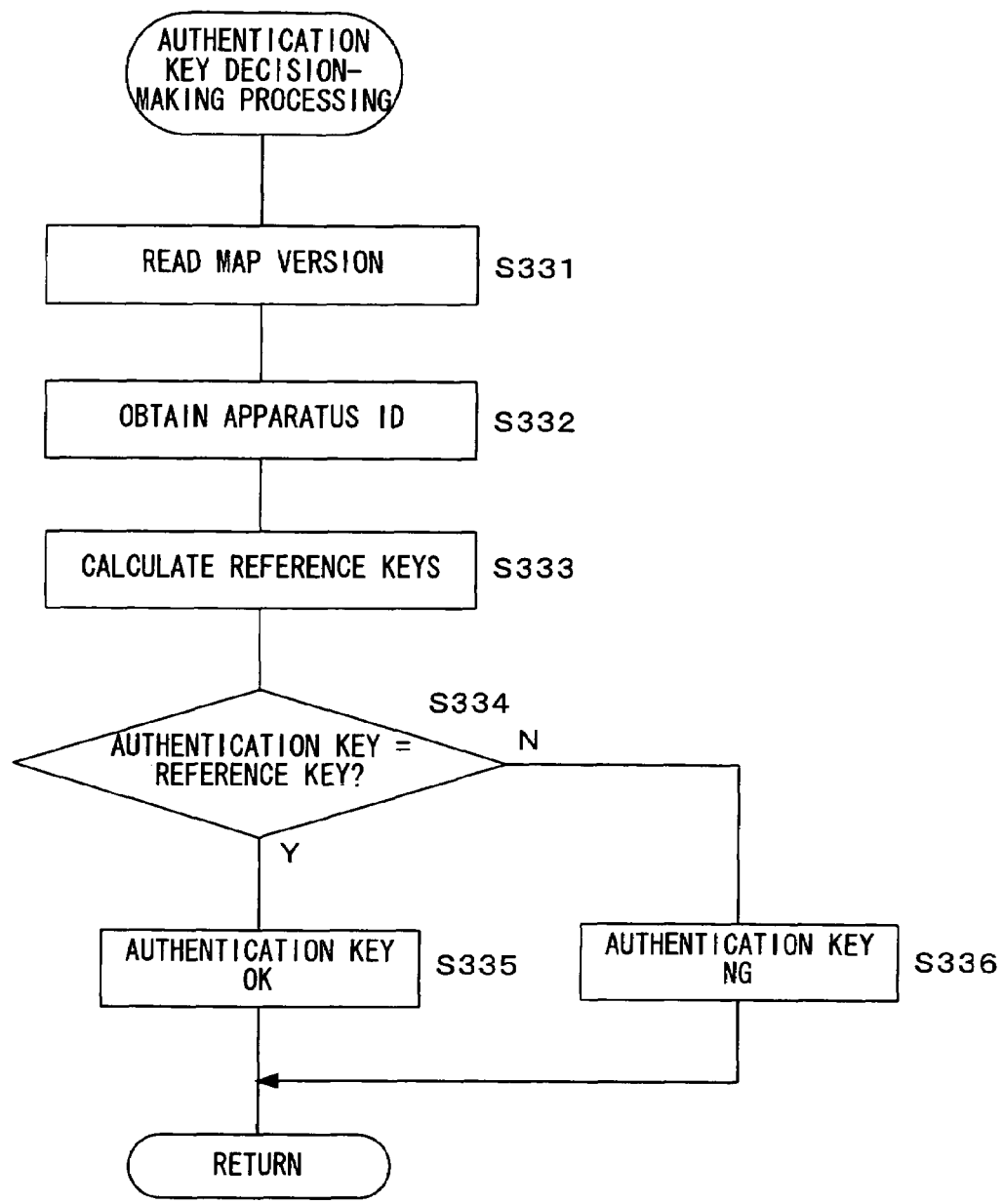
FIG. 5 presents a detailed flowchart of the authentication key decision-making processing.

Next, the authentication key decision-making processing executed in step S330 in FIG. 4 is explained in detail in reference to the flowchart presented in FIG. 5. In step S331, the map version of the update map data recorded in the DVD disc 5 or the HDD 12 is read. Information indicating the map version is recorded the header portion or the like of each map file. In step S332, the apparatus ID of the navigation apparatus 1 is obtained. The apparatus ID information is obtained from, for instance, a ROM (not shown) within the navigation main unit 11, in which the apparatus ID information is recorded.

In step S333, reference keys in reference to which the authentication key is to be checked are calculated for all the map areas included in the update map data based upon the map version read in step S331 and the apparatus ID obtained in step S332. The reference keys are calculated in a manner identical to the manner with which the authentication key is generated at the management server 4 as described earlier. It is to be noted that prior to the authentication key entry by the user, the user may be enabled to select a map area for which a reference key is to be calculated.

In step S334, the authentication key entered by the user prior to the processing in FIG. 5 is checked in reference to the reference keys calculated in step S333 and a decision is made as to whether or not they match. If reference keys for a plurality of map areas have been calculated in step S333, a decision is made as to whether the authentication key entered by the user matches any of the reference keys or the authentication key matches none of the reference keys. If there is a match, the operation proceeds to step S335, whereas the operation proceeds to step S336 if there is no match. In step S335, the results of the processing, i.e., that the authentication key having been entered is OK, are indicated before the processing in FIG. 5 ends and the operation proceeds to step S340 in FIG. 4. In step S336, on the other hand, the results of the processing, i.e., that the authentication key having been entered is NG, are indicated, before the processing in FIG. 5 ends and the operation proceeds to step S340 in FIG. 4.

The navigation apparatus 1 executes the processing described above at the navigation main unit 11 when the update map data are installed. Next, the processing executed when the navigation apparatus 1 having installed therein the update map data is started up is explained in detail in reference to the flowchart presented in FIG. 6. It is to be noted that the processing in FIG. 6 is executed in the navigation main unit 11.

In step S1100 in FIG. 6, a decision is made as to whether or not the restrictions on the use of any map file have been cleared by referencing the flag information. As explained earlier, the flag information contains recorded therein the information indicating whether or not the restrictions on the use of the individual map files have been cleared. If the restrictions on the use of any of the map files have been cleared, the operation proceeds to step S1200, whereas the operation proceeds to step S1300 if the restrictions on the use of all the map files are still in effect. In step S1200, the use of the map file with regard to which the restrictions have been lifted is enabled and then the operation proceeds to step S1300.

In step S1300, a decision is made as to whether or not the initial trial period following the installation of the update map data recorded in the HDD 12 is still valid. This decision may be made by recording the installation date in the header information in the map files and judging whether or not the difference between the current date/time and the installation date/time is equal to or less than the length of the trial period. If the trial period has expired, the operation proceeds to step S1400, whereas the operation proceeds to step S1600 if the trial period is still valid.

In step S1400, a lapsed valid period screen is brought up on display to inform the user that the trial period has expired. An example of the lapsed valid period screen is shown in FIG. 11. By displaying a screen such as that shown in FIG. 11, the user wishing to utilize the update map data continuously is prompted to enter the authentication key. In step S1500, the use of all the map files except for the map file the use of which has been enabled in step S1200 is disabled. Once step S1500 is executed, the processing flow in FIG. 6 ends, and navigation processing is executed by using the non-updated map data and the map file of the update map data the use of which has been enabled.

In step S1600, a remaining valid period screen is brought up on display to inform the user of the length of the remaining trial period. FIG. 12 shows an example of the remaining valid period screen. By displaying a screen such as that shown in FIG. 12, the user is reminded that he will need the authentication key when the trial period expires. In step S1700, the use of all the map files is enabled. Upon executing step S1700, the processing flow in FIG. 6 ends. Subsequently, the navigation processing is executed by using all the map files containing the entire update map data.

The following advantages are achieved in the first embodiment described above.

(1) The management server 4 generates authentication keys based upon apparatus-inherent IDs assigned to individual navigation apparatuses. As the authentication key generated in correspondence to a given navigation apparatus 1 is entered by the user, the navigation apparatus 1 either enables or disables the use of the update map data installed in the HDD 12 based upon the authentication key having been entered. As a result, unauthorized copying of the update map data can be prevented by utilizing the authentication keys which are inherent to the individual users.

(2) The management server 4 generates each authentication key based upon the apparatus ID, the update map data version and the map area specified by the user. As the user enters the authentication key at the navigation apparatus 1, the navigation apparatus 1 obtains the apparatus ID information stored in the navigation apparatus 1 and also reads the update map data version information to calculate reference keys in correspondence to the individual map areas included in the update map data. Then, it makes a decision as to whether or not the correct authentication key has been entered by verifying the authentication key in reference to the reference keys, and if the authentication key is judged to be the correct authentication key, it clears the restrictions on the use of the update map data installed in the HDD 12 over the map area specified by the user and enables their use. If, on the other hand, the authentication key is judged to be incorrect, the restrictions are not cleared and the use of the update map data is disabled. As a result, map data can be updated in units of the individual map areas.

(3) During the specific trial period, the use of the update map data installed in the HDD 12 is enabled without requiring the user to enter the authentication key, and once the trial period expires, the use of the update map data is disabled unless the user enters the authentication key. Thus, as the user is enabled to start using the update map data without difficulty, the user is motivated to use the update map data.

Second Embodiment

Figure 13:
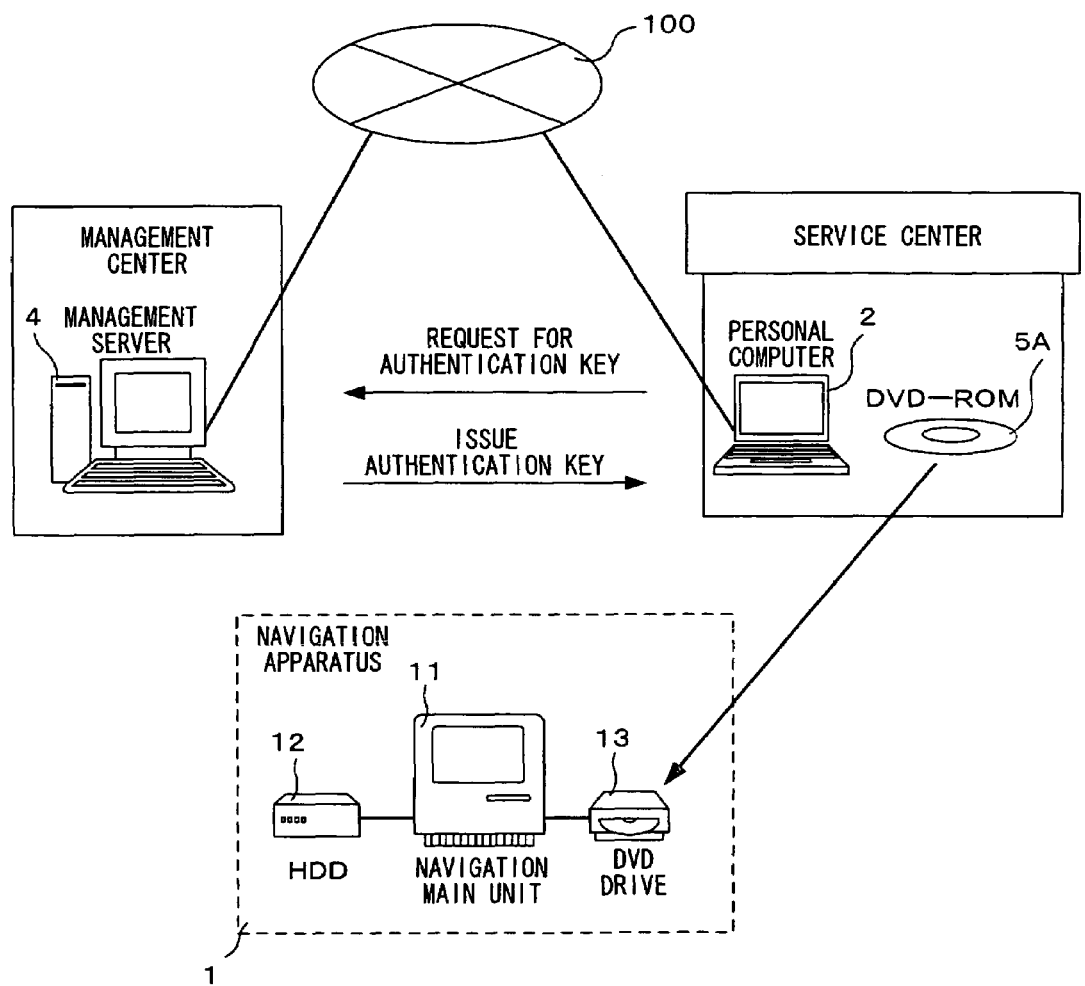
FIG. 13 shows a second embodiment of the present invention.

FIG. 13 shows the second embodiment of the present invention. In this embodiment, map data are updated by using a DVD ROM 5A having recorded therein update map data, which is kept at a service center. The service center may be an auto dealer that provides after sales service. In this case, the user does not need to download the update map data from the management server 4, and instead, service personnel at the service center or the user himself loads the DVD ROM 5A in the DVD drive 13 to install the update map data in the HDD 12.

When the user wishes to continue to use the installed update map data beyond the trial period, he issues a request to the management server 4 for an authentication key from a personal computer 2 installed at the service center and then enters the authentication key issued in response to the request at the navigation apparatus 1. The account processing in this case may be executed at the management center as in the first embodiment or at the service center. Details of the second embodiment other than those explained above are identical to the details having been explained in reference to the first embodiment.

Third Embodiment

Figure 14:
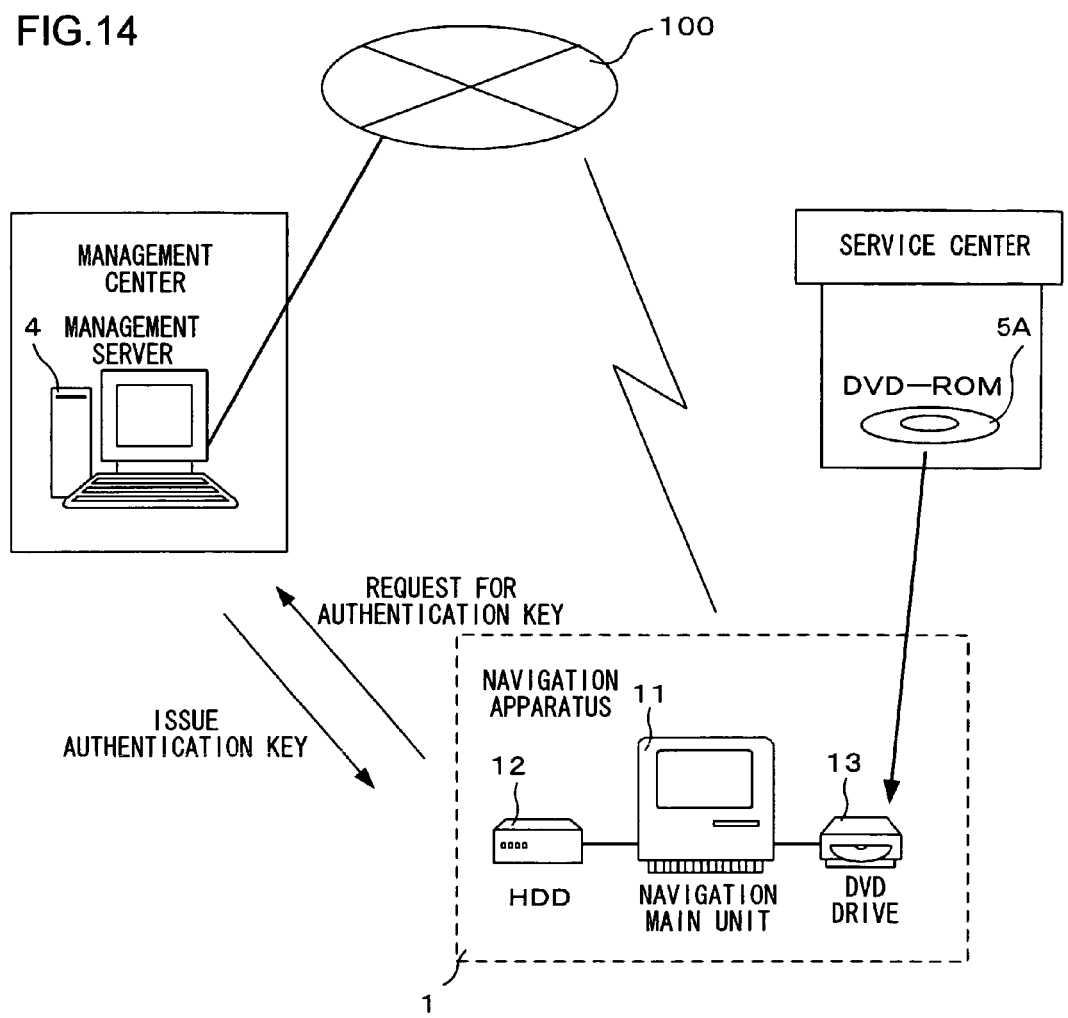
FIG. 14 shows a third embodiment of the present invention.

FIG. 14 shows the third embodiment of the present invention. In this embodiment, a request for an authentication key is issued from the navigation apparatus 1 directly to the management server 4, and in response, the management server 4 issues the authentication key to the navigation apparatus 1. A means for wireless communication such as a portable telephone connects the navigation apparatus 1 to the management server 4 via the public network 100. The authentication key having been issued is directly recognized at the navigation apparatus 11 without requiring user entry.

The update map data may be installed in the embodiment as illustrated in the figure, by using the DVD ROM 5A having recorded therein the update map data kept at the service center, as in the second embodiment. Alternatively, a structure in which the user obtains the DVD ROM 5A through another channel may be adopted. For instance, the DVD ROM 5A may be mailed to the user free of charge. Or, as in the first embodiment, the user may download the update map data from the management server 4 into his personal computer, store the downloaded update map data in a DVD disc and install the data from the DVD disc. Details other than those explained above are identical to the details explained in reference to the first and second embodiments.

Fourth Embodiment

Figure 15:
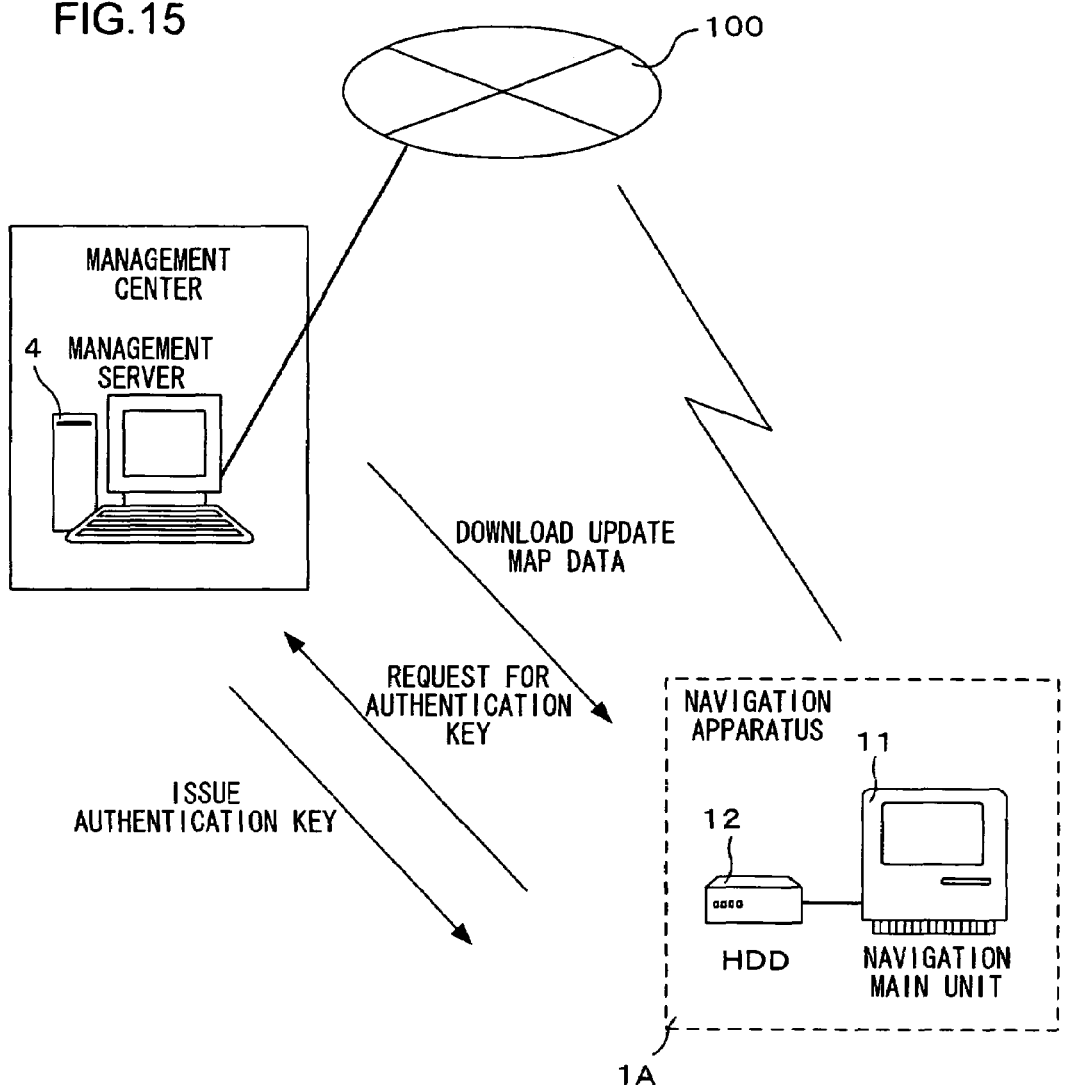
FIG. 15 shows a fourth embodiment of the present invention.

The fourth embodiment of the present invention is shown in FIG. 15. In this embodiment, in addition to issuing the authentication key as explained in reference to the third embodiment, the update map data, too, are directly downloaded from the management server 4 and installed into a navigation apparatus 1A. For this reason, the navigation apparatus 1A in the embodiment does not need to include a DVD drive, unlike the navigation apparatus having been explained in reference to the first through third embodiments.

It is desirable that the update map data be obtained in smaller units in this embodiment in order to reduce the length of communication time and the communication fee for a single download. In the embodiment, the user may be enabled to select the contents he wishes to obtain. It is to be noted that a single authentication key may be commonly used for a plurality of data acquisitions. Details other than those explained above are identical to the details having been explained in reference to the first through third embodiments.

The second through fourth embodiments described above achieves advantages similar to those of the first embodiment.

Fifth Embodiment

Figure 16:
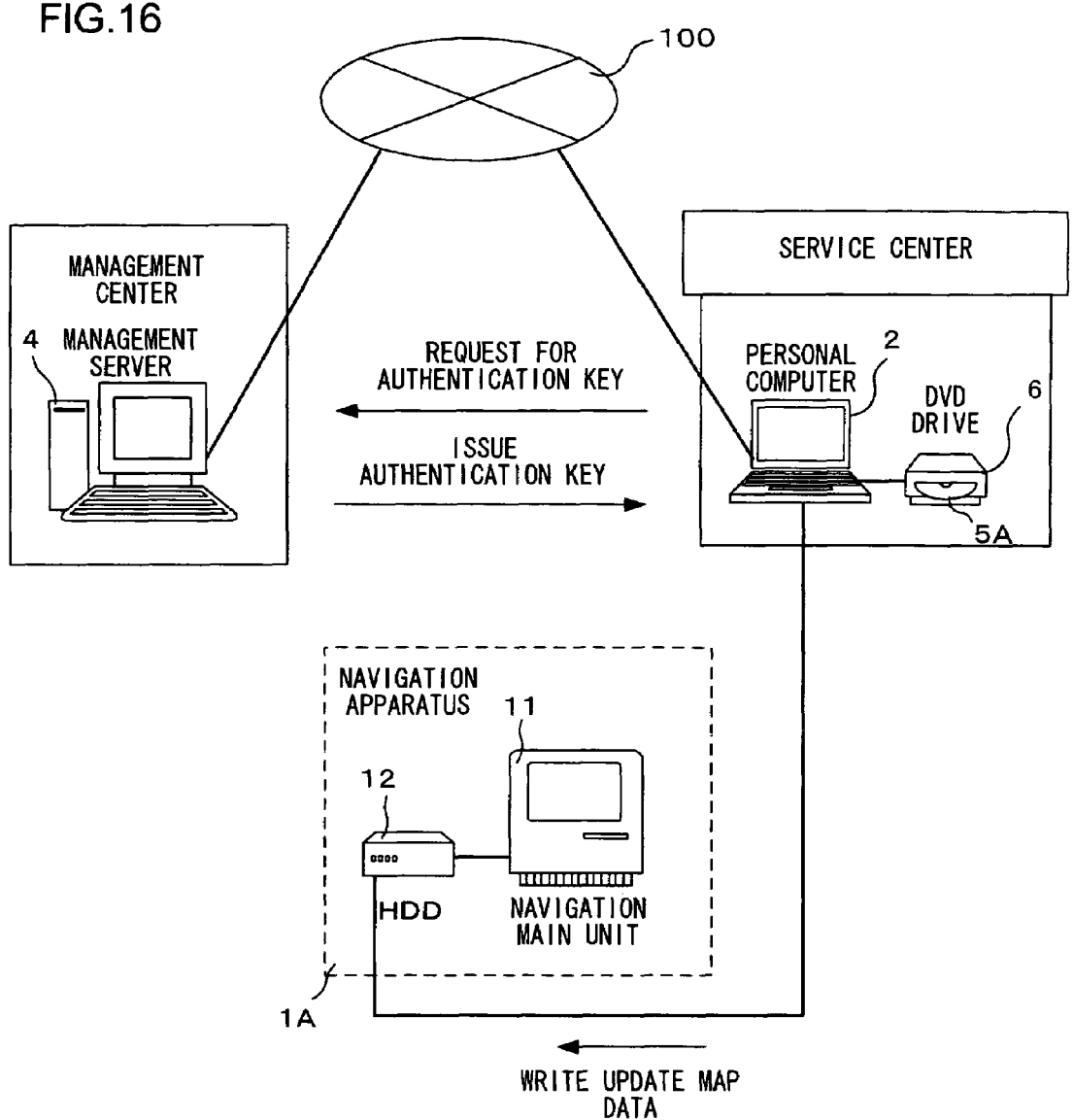
FIG. 16 shows a fifth embodiment of the present invention.

FIG. 16 shows the fifth embodiment of the present invention. In the embodiment, a personal computer 2 installed at the service center and the HDD 12 of the navigation apparatus 1A are directly connected with each other via a cable or the like. A DVD drive 6 having loaded therein the DVD ROM 5A is connected to the personal computer 2. The personal computer 2 connected with the HDD 12 reads out the update map data recorded in the DVD ROM 5A via the DVD drive 6 and writes the update map data having been read out into the HDD 12. The map data are thus updated.

The authentication key may be issued and entered in the embodiment by adopting a method similar to that explained in reference to the second embodiment. Namely, a request for the authentication key is transmitted from the personal computer 2 to the management server 4, and the authentication key transmitted in response from the management server 4 is displayed at the personal computer 2. A service person at the service center or the user then enters the authentication key at the navigation apparatus 1A. Alternatively, the authentication key transmitted from the management server 4 may be directly transmitted to the navigation apparatus 1A without displaying it at the personal computer 2. Such a system eliminates the need for authentication key entry.

In addition, the processing in FIGS. 3 through 5 executed when the update map data are installed may be executed at the personal computer 2 instead of in the navigation main unit 11 in the embodiment. By having the processing executed at the personal computer 2, the map data can be updated even when the power to the navigation main unit 11 is in an off state. In other words, the map data update can be executed even when the engine of the vehicle is not running.

The fifth embodiment explained above, too, achieves advantages similar to those of the first through fourth embodiments.

Sixth Embodiment

The sixth embodiment of the present invention is explained below. While the authentication key is generated by using the information indicating the apparatus ID, the map version and the map area in the previous embodiments, the authentication key is generated in this embodiment by using the user ID in addition to the apparatus ID information, the map version information and the map area information. The user ID as referred to in this context means a string of characters and symbols inherently assigned to each navigation apparatus user, which may be issued by the management center when the navigation apparatus is purchased or at the time of the user support registration.

Any of the system configurations explained in reference to the previous embodiments may be adopted as the system configuration of the embodiment. Namely, any of the system configurations in FIGS. 1, 13, 14, 15 and 16 may be adopted. In any of the system configurations, the processing for the authentication key generation, the authentication key entry and the decision-making in sixth the embodiment can be executed in a similar manner. For this reason, the following explanation is given on an example in which the system configuration shown in FIG. 1 is adopted.

FIGS. 17A through 17G shows examples of screens that may be brought up on display at the personal computer 2 when the authentication key is issued in the embodiment. At the personal computer 2, a user ID entry screen such as that shown in FIG. 17A is displayed first. In the user ID entry screen, the user enters the pre-assigned user ID to the user in an entry field 27 through a key operation or the like at the personal computer 2. It is to be noted that at this time, a password assigned in advance in correspondence to the user ID may be entered. The information indicating the user ID and the password thus entered is then transmitted from the personal computer 2 to the management server 4.

The management server 4 identifies the user based upon the user ID information and the password information transmitted from the personal computer 2, and transmits information related to the particular user, i.e., information indicating the user name and the update history, to the personal computer 2. Upon receiving the information, the personal computer 2 displays the user name in the screen in FIG. 2A to bring up an authentication key issue request screen such as that shown in FIG. 17B. As the user selects an update button 21 in the screen with a mouse or the like, the display shifts to the next screen, i.e., an apparatus ID entry screen shown in FIG. 17C.

In the apparatus ID entry screen shown in FIG. 17C, as the apparatus ID of the navigation apparatus 1 is entered in an entry field 22 in a manner similar to the screen shown in FIG. 2B, the display shifts to the next screen, i.e., an update area selection screen shown in FIG. 17D. It is to be noted that by having the apparatus IDs of the individual users preregistered at the management server 4, it is possible to skip the display of the apparatus ID entry screen shown in FIG. 17C.

In the update area selection screen shown in FIG. 17D similar to the screen shown in FIG. 2C the user is prompted to select a screen in which the update map data version and the update map area. In addition, based upon the update history information transmitted from the management server 4, map data having already been updated are displayed in a manner easily distinguishable from non-updated image data. In this example, a field with "'02 version" in a version selection field 23 is displayed by using a different color, indicating that the map data have already been updated to this particular map version. Once the update map data version and the map area are selected, the display shifts to the next screen, i.e., a verification screen in FIG. 17E.

In the verification screen shown in FIG. 17E, the results of the apparatus ID entry and the results of the update map data version and map area selection are displayed as in the screen in FIG. 2D. As an OK button 25 is selected in the screen, account information is transmitted from the management server 4 and a fee display screen shown in FIG. 17F is brought up on display. As an authentication key display button 26 is selected in this screen, the authentication key generated as explained later by the management server 4 is transmitted from the management server 4 and thus, the display shifts to an authentication key display screen shown in FIG. 17G. The authentication key is thus issued.

In the embodiment, when the management server 4 generates the authentication key, the user ID information is used in addition to the information indicating the apparatus ID, the map version and the map area as described earlier. The authentication key may be generated in the embodiment by adopting a method similar to that explained in reference to the first embodiment.

For instance, let us assume that the apparatus ID is "abcdef", the map version is "03" and the map area is "Kanto" and the user ID is "789". With "03" indicating the map version and "A" representing a numerical value which indicates the map area, an authentication key such as "a0b3cAd7e8f9" can be generated by shuffling the numerals. In this example, the numerals indicating the apparatus ID are assigned to the first, third, fifth, seventh, ninth and eleventh places in the authentication key, starting from the left side, the numerals indicating the map version are assigned to the second and fourth places, the numerical value indicating the map area is assigned to the sixth place and the numerals in the user ID are assigned to the eighth, tenth and twelfth places. The authentication key, which contains the numerals in the apparatus ID inherent to the particular navigation apparatus 1 and also the user ID indicates a number inherent to the user.

It is to be noted that the authentication key generation method described above is simply an example, and authentication keys may be generated by any of various other methods. As long as each authentication key that is generated contains information indicating the corresponding apparatus ID, map version, map area and user ID, and is inherent to the specific user, it may be generated through any method.

Figure 18:
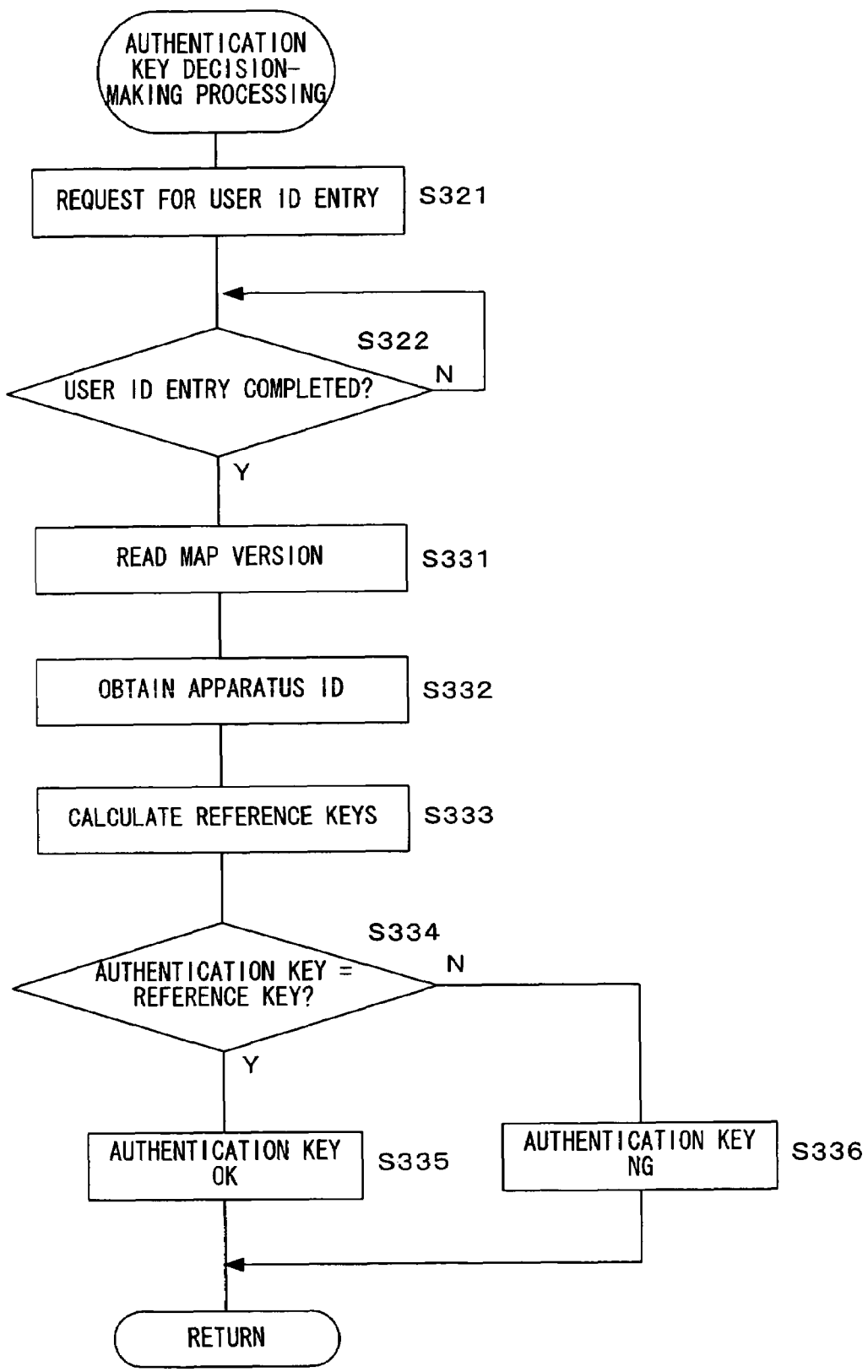
FIG. 18 presents a detailed flowchart of the authentication key decision-making processing executed in the sixth embodiment.

Next, the authentication key decision-making processing executed in the navigation main unit 11 in the embodiment is explained in detail. When the authentication key generated as explained above is entered at the navigation main unit 11, a judgment is made on the entered authentication key in the embodiment by executing the processing in the flowchart presented in FIG. 18 in step S330 in FIG. 4, instead of the processing in the flowchart presented in FIG. 5.

In step S321, an entry screen is brought up on display to enable the user to enter the user ID, and the user is prompted to enter the user ID. In the following step S322, a decision is made as to whether or not the user ID entry has been completed in the user ID entry screen brought up on display in step S321. For instance, the entry is judged to have been completed if a numerical value with a predetermined number of digits has been entered or a verification operation has been performed, but the entry is judged to be incomplete otherwise. When the entry is completed, the operation proceeds to the next step S331, whereas the operation remains in step S322 while the entry is incomplete.

In step S331 and subsequent steps, processing similar to that executed in the individual steps in FIG. 5 is executed. When reference keys are calculated in step S333, the user ID information as well as the information indicating the apparatus ID, the map version and the map area is used as in the authentication key generation by the management server 4 explained earlier. As a result, a reference key matching the authentication key is calculated to allow a decision to be made as to whether or not the authentication key is correct in step S334.

By adopting the sixth embodiment described above, in which the authentication key is generated based upon the user ID information as well as the apparatus ID information, the map version information and the map area information, the user can be identified with ease at the management center, and thus, the user management including the account management and the update history management can be implemented in an optimal manner. The level of user management achieved in the sixth embodiment is particularly effective in conjunction with a map update service adopting an annual fee system and a map update service through which map data are updated free of charge or for a fixed fee during a specific period of time following the purchase of the navigation apparatus and once the period ends, the user is charged for the service in correspondence to the volume of updated map data.

It is to be noted that while an explanation is given above in reference to the embodiments on an example in which the map data are recorded into the HDD, a recording device other than an HDD, e.g., a semiconductor memory, such as a flash memory, may be used, instead, as long as the recording device is write enabled.

In addition, an explanation is given above in reference to the embodiments on an example in which the authentication key having been entered is checked in reference to the reference keys calculated based upon the map version of the update map data, the map area over which the data are to be updated and the apparatus ID of the navigation apparatus to make a decision as to whether or not the correct authentication key has been entered in the navigation apparatus 1 or 1A. Instead, the authentication key having been entered may be decoded through processing that is the reverse of the processing executed to generate the authentication key to ascertain the map version, the map area and the apparatus ID, and a decision may be made as to whether or not the authentication key having been entered is correct.

In more specific terms, the following processing may be executed. Instead of executing the processing in steps S331 through S334 in FIG. 5, processing for ascertaining the map version, the map area and the apparatus ID by decoding the authentication key having been entered and processing for making a decision as to whether or not the details thus ascertained match the map version and the map area in the update map data and the apparatus ID of the navigation apparatus are executed. If the details match, the operation proceeds to step S335, in which the processing results, i.e., that the authentication key is OK, are indicated, whereas if the details do not match, the operation proceeds to step S336 in which the processing results deeming that the authentication key is NG are indicated. Then, the operation proceeds to step S340 in FIG. 4.

In addition, in any of the embodiments described above, the apparatus ID information may also be written when the update map data are written into the HDD 12 of the navigation apparatus 1 or 1A. In this case, when the navigation apparatus is started up after the trial period expires, the apparatus ID written in the navigation main unit 11 can be checked against the inherent apparatus ID and the use of the update map data can be enabled only if they match. As a result, even if the HDD 12 is disengaged and installed in another navigation apparatus, illegal use of the update map data is disabled.

While an explanation is given above in reference to the individual embodiments on various examples in which the management server 4 constitutes the authentication key generation device, the present invention is not limited to the examples presented in the embodiments, and other modes that are conceivable within the scope of the technical field of the present invention are also considered to be within the scope of the present invention.

What is claimed is:

1. A navigation apparatus for use in a map data update system including an authentication key generation apparatus, comprising:

an obtaining unit that obtains the authentication key generated by the authentication key generation apparatus based upon an apparatus-inherent ID assigned each of the navigation apparatus, a version of an update map data and a specified map area;

a calculation unit that calculates a reference key to be referenced against the authentication key based upon information indicating the apparatus ID, which is held at the navigation apparatus, and update map data version information and map area information recorded in the update map data that has been installed in the navigation apparatus;

a decision-making unit that makes a decision as to whether or not the authentication key is correct by comparing the authentication key having been obtained with the reference key; and an enabling/disabling unit that enables the use of the update map data over the specified map area if the authentication key is judged to be correct or disables the use of the update map data if the authentication key is judged to be incorrect.

2. A computer-implemented map data update method for updating map data used in an on-vehicle navigation apparatus by installing an update map data, comprising:

generating an authentication key based upon an apparatus-inherent ID assigned each of the navigation apparatus and a version of the update map data; and enabling or disabling a use of the update map data installed in the navigation apparatus by verifying the authentication key assigned to the navigation apparatus, wherein:

the authentication key is generated in response to a request issued from a user and entered in the navigation apparatus by the user; and the navigation apparatus enables the use of the update map data during a predetermined period of time regardless of whether or not the authentication key is entered by the user and disables the use of the update map data unless the authentication key is entered after the predetermined period of time expires.

3. A computer-implemented map data update method for updating map data used in an on-vehicle navigation apparatus by installing an update map data, comprising:

generating an authentication key based upon an apparatus-inherent ID assigned each of the navigation apparatus, a version of the update map data and a specified map area; and enabling or disabling a use of the update map data installed in the navigation apparatus by verifying the authentication key assigned to the navigation apparatus, wherein:

the navigation apparatus obtains the authentication key generated outside based upon the apparatus ID, the version of the update map data and the specified map area;

the navigation apparatus calculates a reference key to be referenced against the authentication key based upon information indicating the apparatus ID, which is held at the navigation apparatus, and update map data version information and map area information recorded in the update map data;

the navigation apparatus makes a decision as to whether or not the authentication key is correct by comparing the authentication key having been obtained with the reference key; and the navigation apparatus enables the use of the update map data over the specified map area if the authentication key is judged to be correct or disables the use of the update map data if the authentication key is judged to be incorrect.

4. A computer-implemented map data update method according to claim 2, wherein:

the authentication key is generated based upon the apparatus ID, the version of the update map data and a user-inherent ID assigned to each user in advance.

5. A computer-implemented map data update method according to claim 3, wherein:

the authentication key is generated based upon the apparatus ID, the version of the update map data, the specified map area and a user-inherent ID assigned to each user in advance.

* * * * *